(12) United States Patent
Finlow-Bates et al.

(10) Patent No.: US 8,743,699 B1
(45) Date of Patent: Jun. 3, 2014

(54) RFID TAG ASSISTED GPS RECEIVER SYSTEM

(75) Inventors: Keir Finlow-Bates, Tampere (FI); Joonas V. T. Viskari, Lempaala (FI); Terry FK Ngo, Bellevue, WA (US)

(73) Assignee: QUALCOMM Incorporated, San Diego, CA (US)

( * ) Notice: Subject to any disclaimer, the term of this patent is extended or adjusted under 35 U.S.C. 154(b) by 789 days.

(21) Appl. No.: 12/954,490

(22) Filed: Nov. 24, 2010

Related U.S. Application Data

(63) Continuation-in-part of application No. 12/840,155, filed on Jul. 20, 2010.

(60) Provisional application No. 61/332,640, filed on May 7, 2010.

(51) Int. Cl.
  *H04L 12/26* (2006.01)
(52) U.S. Cl.
  USPC ............... 370/241; 340/572.1; 342/357.22
(58) Field of Classification Search
  None
  See application file for complete search history.

(56) References Cited

U.S. PATENT DOCUMENTS

| | | | |
|---|---|---|---|
| 6,108,558 A | 8/2000 | Vanderspool | |
| 6,801,782 B2 | 10/2004 | McCrady et al. | |
| 7,057,557 B2 | 6/2006 | Lee | |
| 7,065,369 B2 | 6/2006 | Tang et al. | |
| 7,215,966 B2 | 5/2007 | Joshi | |
| 7,574,216 B2 | 8/2009 | Leitch et al. | |
| 7,800,531 B2 | 9/2010 | Wang et al. | |
| 7,877,100 B2 | 1/2011 | Rick et al. | |
| 8,026,850 B2 | 9/2011 | Seong et al. | |
| 8,160,609 B2 | 4/2012 | Alles et al. | |
| 8,184,038 B2 | 5/2012 | Ekbal et al. | |
| 8,233,457 B1 | 7/2012 | Chen et al. | |
| 8,335,173 B2 | 12/2012 | Hart et al. | |
| 8,370,629 B1 | 2/2013 | Ngo et al. | |
| 2002/0194266 A1 | 12/2002 | Brebner et al. | |
| 2003/0103475 A1 | 6/2003 | Heppe et al. | |
| 2003/0118015 A1 | 6/2003 | Gunnarsson et al. | |
| 2005/0124319 A1 | 6/2005 | Williams et al. | |
| 2005/0124355 A1 | 6/2005 | Cromer et al. | |
| 2006/0052115 A1 | 3/2006 | Khushu | |
| 2006/0148486 A1 | 7/2006 | Kim et al. | |
| 2007/0025296 A1 | 2/2007 | Jung et al. | |

(Continued)

FOREIGN PATENT DOCUMENTS

| | | |
|---|---|---|
| EP | 0320913 A2 | 6/1989 |
| EP | 1253437 A2 | 10/2002 |
| EP | 1587255 A1 | 10/2005 |
| WO | WO 2005/006593 A1 | 1/2005 |

*Primary Examiner* — Khoa Huynh
(74) *Attorney, Agent, or Firm* — Mahamedi Paradice Kreisman LLP

(57) ABSTRACT

A system and method are disclosed for improving the speed of operation and accuracy of GPS receivers. The system comprises a RFID assisted GPS (RAGPS) receiver and geographically dispersed RFID assistance tags. The RAGPS receiver and the RFID assistance tags store location data comprising current location estimate, almanac, and ephemeris data. The location data is time stamped. The RFID assisted GPS (RAGPS) receiver comprises a GPS receiver, a RFID tag reader, a RFID transmitter and a controller. The controller comprises software that transfers the location data to and from the RAGPS receiver and a RFID assistance tag. The method discloses the RAGPS receivers reading up-to-date location data from a nearby RFID assistance tags and similarly if the RAGPS receivers have up-to-date location data already, the RAGPS receivers may write that location data to a nearby assistance tags that lacks up-to-date location data.

18 Claims, 9 Drawing Sheets

(56) References Cited

U.S. PATENT DOCUMENTS

| | | | |
|---|---|---|---|
| 2007/0103303 A1* | 5/2007 | Shoarinejad | 340/572.1 |
| 2007/0121560 A1 | 5/2007 | Edge | |
| 2007/0276583 A1* | 11/2007 | Dobeck et al. | 701/200 |
| 2008/0109885 A1 | 5/2008 | Sim et al. | |
| 2008/0291883 A1 | 11/2008 | Seok | |
| 2009/0079622 A1 | 3/2009 | Seshadri et al. | |
| 2009/0093956 A1 | 4/2009 | Wu et al. | |
| 2009/0121927 A1* | 5/2009 | Moshfeghi | 342/357.03 |
| 2009/0224967 A1 | 9/2009 | Wang et al. | |
| 2010/0135178 A1 | 6/2010 | Aggarwal et al. | |
| 2012/0269170 A1 | 10/2012 | Chen et al. | |

\* cited by examiner

RFID TAG ASSISTED GPS RECEIVER SYSTEM

CROSS REFERENCE TO RELATED APPLICATION

This application is a Continuation-in-Part (CIP) application to U.S. application Ser. No. 12/840,155, filed Jul. 20, 2010, entitled, "Management-Packet Communications of GPS Satellite Positions", which is hereby incorporated by reference in its entirety, and which further claims the benefit of the priority date of provisional application Ser. No. 61/332,640, filed May 7, 2010.

TECHNICAL FIELD

This invention relates to improving the speed of operation and accuracy of a GPS receiver, specifically by obtaining up-to-date information of the current location estimate, ephemeris data and almanac data from a RFID device.

BACKGROUND OF THE INVENTION

The reception of global positioning system (GPS) satellite position data may be problematic and may negatively impact the performance of GPS receiver. The conventional approach to using global positioning system (GPS) satellites to determine a receiver's position requires the receiver to download navigation messages from four or more visible satellites, extract the broadcast ephemerides for each satellite from the navigation messages, and utilize this ephemeris data to compute the position of the satellites in the ECEF (earth-centered earth-fixed) coordinate system at a specific time. The broadcast ephemerides for each satellite are provided in a frame of data that takes about 30 seconds to send/receive. The broadcast ephemerides are valid for a period of four hours starting from the time the satellite starts to broadcast the navigation data. A control station uploads the data to the satellite less frequently, usually a couple of times a day. After a four-hour period, the receiver has to again download the latest broadcast ephemerides. This process is sometimes referred to a obtaining a "GPS fix".

Under "warm" or "cold" start conditions, the GPS receiver may not have valid ephemerides, and so it may have to wait until at least four satellites have been acquired and their broadcast ephemerides extracted before estimating a position. This extends the time required to acquire valid ephemerides to beyond 30 seconds, perhaps to several minutes, which may not be acceptable to a user.

Furthermore, under weak signal conditions, the signal-to-noise ratio of the signal from one or more satellites may fall below the receiver's threshold to decode the navigation message. There are other assistance systems such as GSM/CDMA assistance (AGPS/3GPP/3GPPS2) although other assistance schemes require network connectivity, and the components may be expensive.

Hence, two perennial problems with GPS receivers are obtaining an estimate of the current location, and obtaining ephemeris and almanac data. Having this data in advance dramatically speeds up the time to obtaining a position fix. It would be beneficial to have a system and method that provides an alternative procedure to update the current location estimate, ephemeris and almanac data in a GPS receiver.

SUMMARY OF THE INVENTION

Embodiments of the invention provide a solution for two perennial problems with GPS receivers. The problems are obtaining an estimate of the current location, and obtaining ephemeris and almanac data. If up-to-date location data is available in advance, the time required to get a location fix is dramatically improved.

Embodiments of the invention are based on a RFID assisted GPS receiver (RAGPS receiver) and one or more RFID assistance tags that are located in geographically dispersed areas of interest. These RFID assistance tags are capable of storing all or part of the location data that includes a current location estimate, ephemeris and almanac data. The RAGPS receiver includes a GPS receiver, a RFID tag reader, a RFID transmitter and a controller. The RAGPS receiver is capable of storing the location data including current location estimate-, ephemeris and almanac data. The controller includes software that transfers the location data to and from the RAGPS receiver and the one or more RFID assistance tags, If the RAGPS receiver has up-to-date location data as compared with a RFID assistance tag, the RAGPS transmits location data to the RFID assistance tag and updates the location data in the RFID assistance tag. Alternatively, if the RFID assistance tag has up-to-date location data as compared with the RAGPS receiver, the RFID assistance tag updates the location data of the RAGPS receiver. The location data of the RAGPS receiver may also be updated by a GPS satellite or a network connection.

Further provided is a method for updating a RAGPS receiver comprising the steps of: using the system comprising a RAGPS receiver and one or more RFID assistance tags. The first step is determining if one of the one or more RFID assistance tags is in range of the RAGPS receiver and connecting the RAGPS receiver with one of the one or more RFID assistance tags that is in range of the RAGPS receiver. When the RAGPS receiver is coupled to a RFID assistance tag, the next step is determining the up-to-date status of the location data of the RFID assistance tag and the location data of the RAGPS receiver.

Once the status of the location data of the RAGPS receiver and the RFID assistance tag is determined, the controller determines if either the location data of the RFID assistance tag, or the location data of the RAGPS receiver, or neither is be updated. Based on this determination, the next step is updating the location data of the RFID assistance tag or the location data of the RAGPS receiver or updating neither.

BRIEF DESCRIPTION OF THE DRAWINGS

The components in the figures are not necessarily to scale, emphasis instead being placed upon illustrating the principles of the present invention. In the figures, like reference numerals designate corresponding parts throughout the different views.

DETAILED DESCRIPTION

Figure 1A:
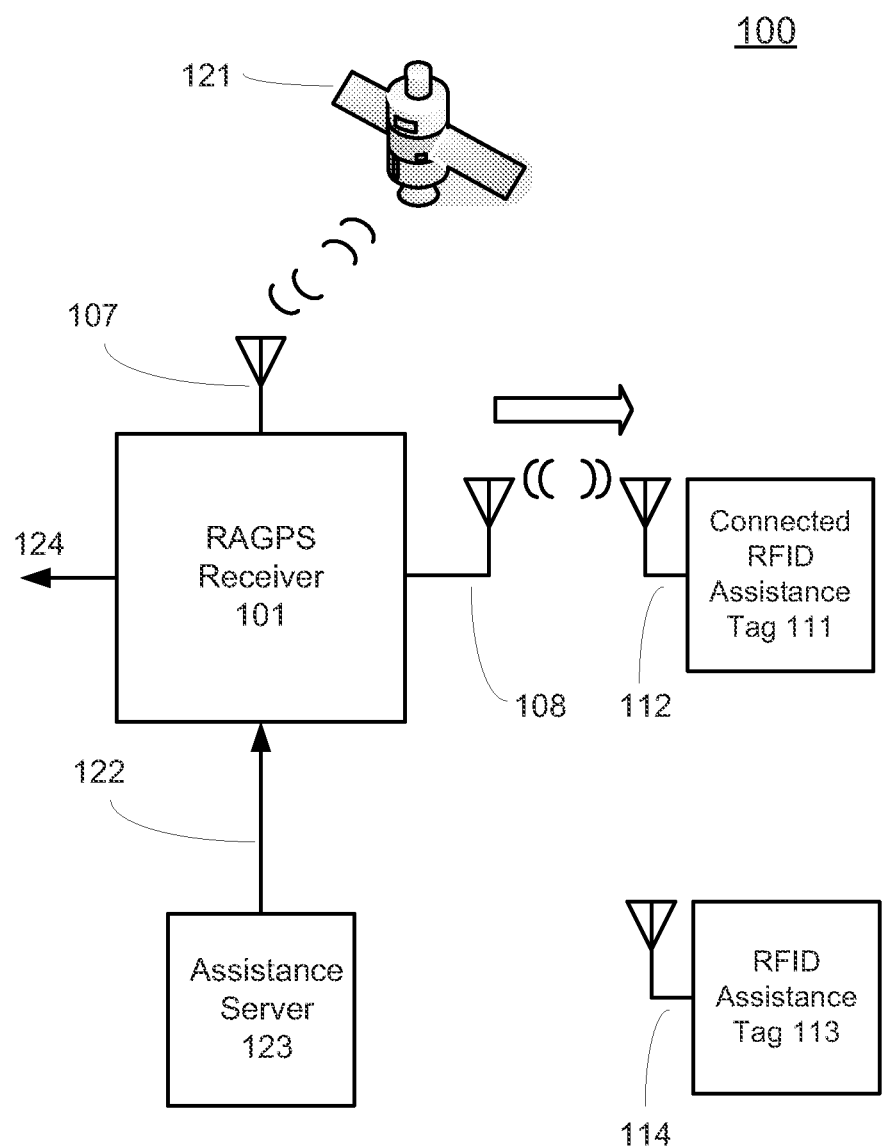
FIG. 1A illustrates a RFID assisted GPS system that is updated by a GPS satellite or by an assistance server in accordance with an embodiment of the present invention.

As described in the Background of the Invention section, two perennial problems with GPS receivers are obtaining an estimate of the current location, and obtaining ephemeris and almanac data. Having this location data in advance dramatically speeds up the time to obtaining a position fix. The present invention utilizes RFID assistance tags that are geographically dispersed as a method to provide updated location data to the GPS receivers. The idea behind using RFID assistance tags is that they are cheap and ubiquitous, easy to replace, and do not require maintenance. The present invention includes RFID tags that can store location data including current location estimate, ephemeris data, and almanac data and suitable GPS receivers which may write this location data to the RFID tags in range if they have up-to-date location data, and they may read the location data of the RFID tag for assistance if they do not have up-to-date location data.

DEFINITIONS

RFID assistance tags refer to RFID tags that are used in a system with RAGPS receivers in the present invention. If a RFID assistance tag is in range of a RAGPS receiver and is communicating with that RAGPS receiver, the RFID assistance tag is referred to as a "connected RFID assistance tag". In the figures, a "connected RFID assistance tag" may be referred to as a "RFID tag".

RFID assisted GPS receivers are referred to as RAGPS receivers. Also, a "receiver" may be referred to as a "RCVR" in the figures.

"Location data" includes current location estimate, ephemeris data and almanac data. The location data in the RAGPS receiver and RFID assistance tags is time stamped with the time and date the location data was updated. A time and date when the location data expires is also noted.

Current location estimate—The estimate of the current latitude and longitude of the GPS receiver. In the figures, "current location estimate" is referred to as "location estimate".

Ephemeris data—GPS satellites include ephemeris data in the signals they transmit to GPS receivers. Ephemeris data is a set of parameters that can be used to accurately calculate the location of a GPS satellite at a particular point in time. It describes the path that the satellite is following as it orbits Earth. To accurately calculate your location, ephemeris data is only usable for a limited time (a few hours or less). Up-to-date data is required to minimize error that results from minor variations in a satellite's orbit. Ephemeris data may be based on the type of GPS satellite system (e.g. Navistar, SBAS, Galileo, etc.)

Almanac data—GPS receivers use almanac data to predict which satellites are nearby when they're looking for GPS signals. Almanac data includes a set of parameters for each GPS satellite that can be used to calculate its approximate location in orbit. Using almanac data saves time by letting the receiver skip looking for satellites that are below the horizon. GPS satellites include almanac data in the signals they transmit to GPS receivers. Although variations in satellite orbits can accumulate with time, almanac data doesn't need to be highly accurate to be useful. Data collected before your receiver was last switched off may remain usable for weeks or months. Almanac data may be based on the type of GPS satellite system (e.g. Navistar, SBAS, Galileo, etc.)

Current location estimates are usually obtained by regularly storing a "last good fix" in non-volatile memory. This process does not work in scenarios where:
  a GPS receiver is turned off prior to boarding a flight, and is then turned back on when the plane lands,
  or where a receiver enters a large signal blocking building such as a shopping mall, and leaves it some time later from a different distant exit. A thick forest would also be a large signal blocking environment.

Typically, ephemeris and almanac data is either obtained by decoding it from the sky (which can take up to 36 seconds), or by injecting it from an assistance server (which requires a network connection to, for example, a mobile phone service or a wireless connection to the internet) or by self-prediction methods (which require previously obtained ephemeris data that is not too old, and significant amounts of computation, or a network connection at an earlier stage to obtain the prediction data).

Ephemeris data in particular ages quickly, and is usually useless within 4 hours. Customers at a shopping mall, passengers on a plane, people in an office or cars in an underground garage can easily find their ephemeris data has gone stale within a day. The methods for overcoming stale or inaccurate data have their own costs and weaknesses.

An alternative approach to update the location data in GPS receivers is to utilize geographically dispersed RFID assistance tags. Some benefits of using this technology include:
  a) RFID assistance tags inexpensive and easy to use, they and can be stuck around signal-blocking locations quickly.
  b) RFID tags can store location data for long periods of time, can have new location data written to them and can send stored location data wirelessly to suitable tag readers.

For example, RFID assistance tags may be distributed liberally around car payment meters in underground garages, at the entrance of and within shops, shopping malls, airports and government buildings, on lamp posts, in tunnels, and so on. GPS receivers may be designed with RFID readers built into them, and with suitable control software. These RFID assisted GPS receivers are referred to as RAGPS receivers. The RAGPS receivers can read location, almanac and ephemeris assistance data from any nearby RFID assistance tags, and similarly if they have such location data already, they can write it to any nearby assistance tags that do not have such location data, or whose location data is old or out of date. As a result, RAGPS receivers help each other by caching useful location data in ubiquitous RFID assistance tags for other RAGPS receivers to use.

RFID tags have been incorporated in GPS receivers to support asset tracking applications. In this case, the GPS receiver includes a RFID tag that can be read by a tag reader, as a form of asset tracking. As such, this RFID system an inexpensive wireless data transfer service There are two types of RFID tags: passive and active. Passive tags are very inexpensive and do not require batteries, but they currently typically only store a small amount of data—enough for a location data structure consisting of longitude and latitude to within 10 cm. Active tags can typically currently store more data (easily coping with the 15-20 kb of data required for the current location estimate, ephemeris and almanac data structures), but require batteries or a power supply, and are more expensive. As the technology advances the two types of RFID tags may converge and it is expected that inexpensive passive RFID tags with significant data storage capacity will become available. In the meantime, existing technology is useable.

The RFID assistance tag typically has its memory organized into a data structure that allows it to store (depending on memory size).

Longitude
Latitude
Ephemeris data for Navistar satellites PRN1-32 (or even Atheros Extended Ephemeris data)
Ephemeris data for SBAS satellites
Ephemeris data for other GPS satellites such as Galileo
Almanac data for the above satellites
The time and date the above data was last updated or written and when the location data expires. (timestamp)

FIG. 1A illustrates one embodiment of the present invention—embodiment 100. Embodiment 100 includes RAGPS receiver 101, connected RFID assistance tag 111, GPS satellite 121, and assistance server 123. The assistance server 123 is coupled to the RAGPS receiver 101 by signal line 122. The RAGPS receiver 101 communicates with GPS satellite 121 via antenna 107. GPS satellite 121 represents multiple GPS satellites that may be present in the sky at a particular point in time. In embodiment 100, RAGPS receiver 101 may receive a signal from either GPS satellite 121 or assistance server 123. The received signal may comprise location data, including current location estimate, ephemeris data and almanac data. The location data in RAGPS receiver 101 may be updated from either GPS satellite 121 or assistance server 123.

The RAGPS receiver 101 may connect with a RFID assistance tag that is in range, such as connected RFID assistance tag 111. After connecting, if the RAGPS receiver 101 determines its location data is up-to-date as compared with the location data in the connected RFID assistance tag 111, the RAGPS receiver 101 transmits the location data in its memory to the connected RFID assistance tag 111. This transmission is coupled from antenna 108 to antenna 112. Accordingly, the connected RFID assistance tag 111 updates the location data in its memory. In addition to storing location data, the time and date this location data was last updated or written is also stored in the RFID memory (i.e. time stamped). A time and date when the location data expires is also noted.

FIG. 1A also shows RFID assistance tag 113 with antenna 114 that are not in range and are not connected to RAGPS receiver 101. The RAGPS receiver 101 provides an output via signal 124.

Figure 1B:
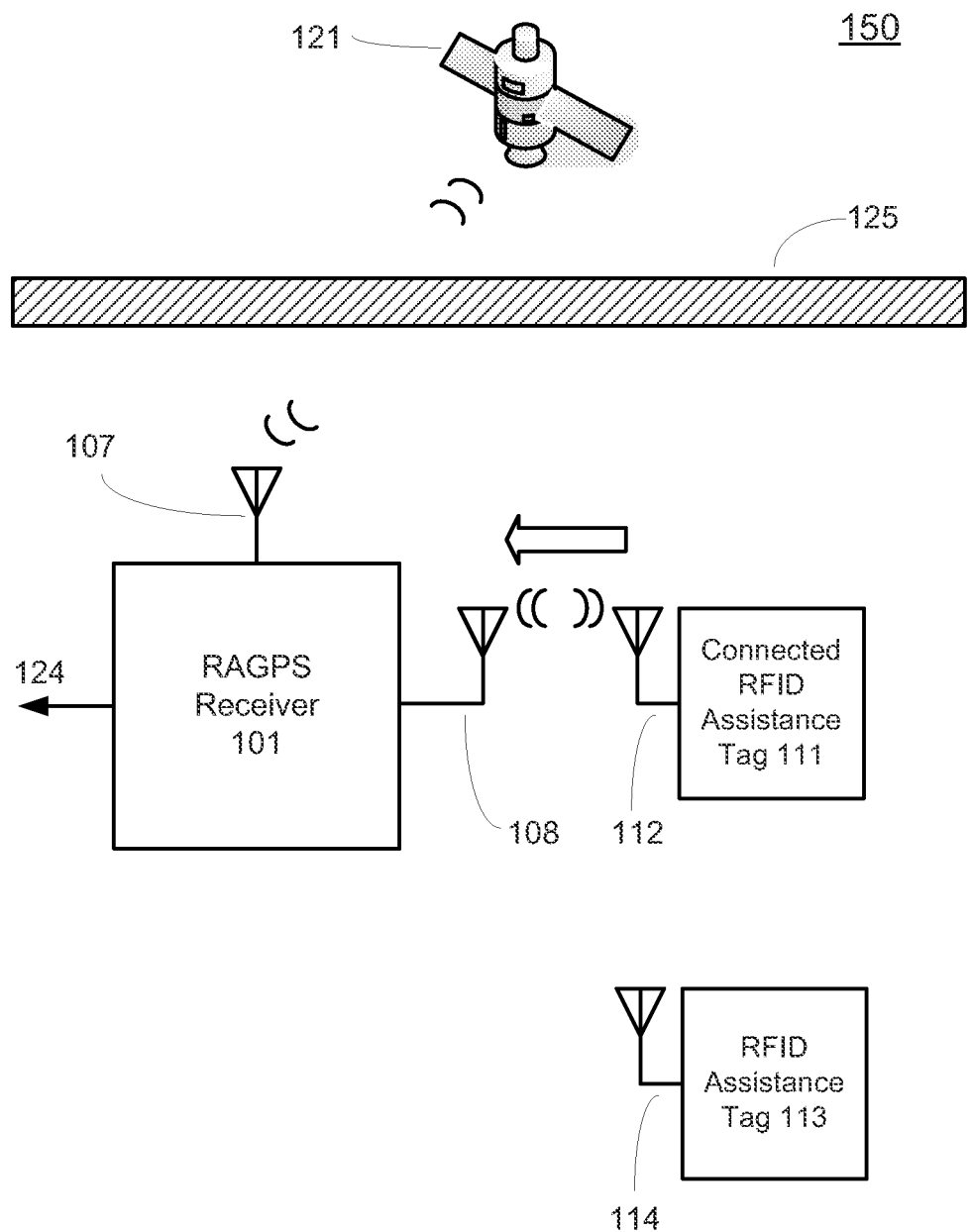
FIG. 1B illustrates a RFID assisted GPS system that is updated by a RFID assistance tag in accordance with an embodiment of the present invention

FIG. 1B illustrates a second embodiment of the present invention—embodiment 150. Embodiment 150 includes RAGPS receiver 101 and connected RFID assistance tag 111.

As illustrated, GPS satellite 121 is unable to communicate with RAGPS receiver 101 due to blockage 125. Since the RAGPS receiver 101 is unable to obtain up-to-date location data from GPS satellite 121 (and there is no assistance server available), the RAGPS receiver 101 communicates with connected RFID assistance tag 111 to determine if connected RFID assistance tag 111 has location data that is up-to-date as compared with the location data of the RAGPS receiver 101. If the connected RFID assistance tag 111 has up-to-date location data, then the up-to-date location data of the connected RFID assistance tag 111 is transmitted from the connected RFID assistance tag 111 to the RAGPS receiver 101 via antenna 112 to antenna 108. Hence, the location data of the RAGPS has been updated.

Figure 2:
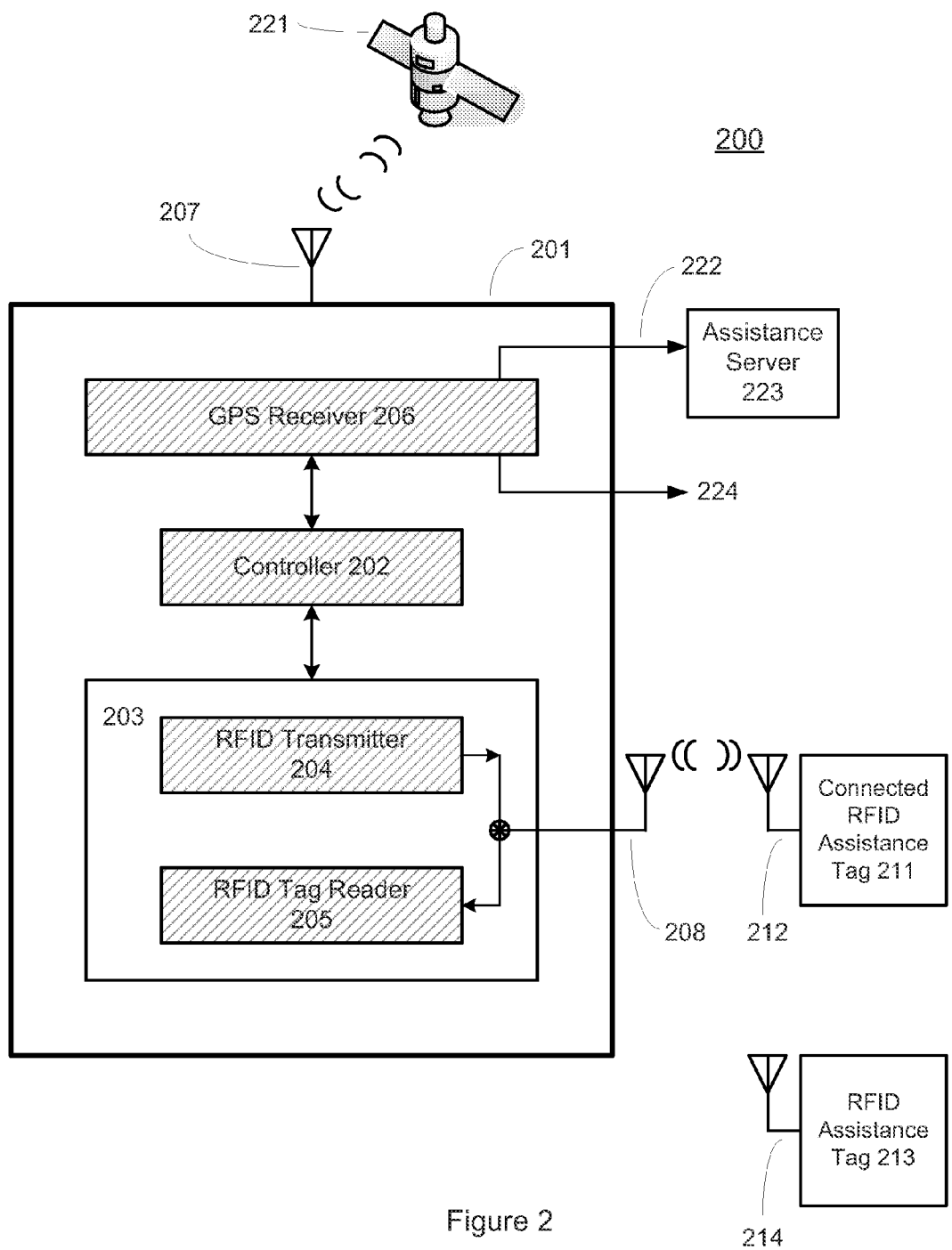
FIG. 2 illustrates a RFID assisted GPS (RAGPS) receiver in accordance with an embodiment of the present invention.

FIG. 2 illustrates an embodiment 200 for a RAGPS receiver 201. As illustrated, RAGPS receiver 201 includes GPS receiver 206, controller 202, RFID subsystem 203, antenna 207 and antenna 208. The RFID subsystem 203 further includes RFID transmitter 204 and RFID tag reader 205. The GPS receiver 206 includes a GPS receiver with memory that is capable of storing location data. Alternatively, the location data may be stored in the controller 202. The location data of GPS receiver 206 may be updated by GPS satellite 221 via antenna 207 or assistance server 223 via signal line 222. This updating action was previously described in the discussion related to FIG. 1A. The RAGPS receiver 201 provides an output via signal 224.

The GPS receiver 206 may also be updated by the connected RFID assistance tag 211.

Controller 202 includes control software for transferring location data to and from the GPS subsystem to the tag reader system, and to and from any suitable RFID assistance tags detected in the vicinity. This data transfer is implemented by the RFID transmitter 204 and RFID tag reader 205 that wirelessly communicate to the connected RFID assistance tag 211 via antennas 208 and antenna 212.

For this example, embodiment 200 illustrates one or more RFID assistance tags. Connected RFID assistance tag 211 is in range of RAGPS receiver 201 and RAGPS receiver 201 is able to communicate with connected RFID assistance tag 211 via antennas 208 and antenna 212. RFID assistance tag 213 with antenna 214 is not in range of RAGPS receiver 201. Hence, RAGPS receiver 201 may not communicate with RFID assistance tag 213.

The following is a description of an example control system. If RAGPS receiver 201 comes within range of connected RFID assistance tag 211, one of four scenarios applies:

Scenario A—RAGPS Receiver 201 lacks up-to-date location data that is available in connected RFID assistance tag 211.

If RAGPS receiver 201 lacks a location fix and lacks a current location estimate and the connected RFID assistance tag 211 has this data, the RAGPS receiver 201 may read the current location estimate from connected RFID assistance tag 211.

If the RAGPS receiver 201 lacks valid ephemeris or almanac data and the connected RFID assistance tag 211 has this data, the RAGPS receiver 201 may read the ephemeris and almanac data from the connected RFID assistance tag 211.

If the RAGPS receiver 201 lacks valid ephemeris or almanac data, and lacks invalid ephemeris or almanac data that is usable by a self-prediction algorithm for producing synthetic ephemeris data, and the connected RFID assistance tag 211 has invalid ephemeris data that is still young enough for use by self-prediction algorithms, then RAGPS receiver 201 may download the stale yet usable ephemeris data and may use it for generating useable synthetic ephemeris data.

If the connected RFID assistance tag 211 has no ephemeris and/or almanac data, or it has ephemeris and/or almanac data that is older than the ephemeris or almanac data in the RAGPS receiver 201, the RAGPS receiver 201 may over-write the ephemeris and/or almanac data on the connected RFID assistance tag 211 with its fresh ephemeris and/or almanac data.

Scenario B—Connected RFID assistance tag 211 lacks up-to-date location data available in the RAGPS receiver 201.

If the connected RFID assistance tag 211 lacks a current location estimate, and RAGPS receiver 201 has this data, the RAGPS receiver 201 may write a fix location to the connected RFID assistance tag 211.

If the RFID tag lacks ephemeris or almanac data, or connected RFID assistance tag's 211 data is older than the RAGPS receiver 201, the RAGPS receiver 201 may overwrite the connected RFID assistance tag's 211 ephemeris and almanac data.

Scenario C—The RAGPS receiver 201 and connected RFID assistance tag 211 have up-to-date location data.

In scenario C, the RAGPS receiver 201 may still help the RFID tag improve its location data. The connected RFID assistance tag 211 will have a slightly different location than the RAGPS receiver. Typically, active RFID tags have a read range of up to 30 meters, and passive RFID tags have a read range of up to 7 meters at the moment, so these distances are added to the GPS receiver's position inaccuracy. As a result the RFID location information may be over-written with an averaging algorithm. If the connected RFID assistance tag 211 cannot perform the averaging calculation, this is done by the RAGPS receiver 201.

Procedure for updating with Scenario C.

1. The RAGPS receiver 201 reads the connected RFID assistance tag 211's current stored location, and the number of previous RAGPS receivers that have contributed to this location (Define this number as k).
2. Calculate the longitude difference between the RAGPS receiver 201's longitude and the connected RFID assistance tag 211's longitude. Define this longitude calculation as δE and similarly for latitude: δN. If the RFID assistance tag 211's old position was
    N, E then the connected RFID assistance tag 211's new position is N+(δN/k), E+(δE/k).
    Effectively each previous RAGPS receiver contributing a new location estimate is averaged in with all previous RAGPS receivers' location estimates.
3. The RAGPS receiver 201 writes back the new location estimate to the connected RFID assistance tag 211.

Scenario D—Neither connected RFID assistance tag 211 nor RAGPS receiver 201 have up-to-date location data.

Nothing is done in this case

In terms of implementation, the RAGPS receiver may include one or more integrated circuits. Each of the one or more RFID assistance tags may include one or more integrated circuits.

A method for updating location data in a GPS receiver utilizing RFID assistance tags is now described. This method is based on the operation of the previously described control system. The operation of the control software is disclosed in FIGS. 3A-3B and 4-7, including flowcharts 300-350 and 400-700. These flowcharts illustrate a method for updating RAGPS receiver 201 as disclosed in embodiment 100, 150 and 200.

Figure 3A:
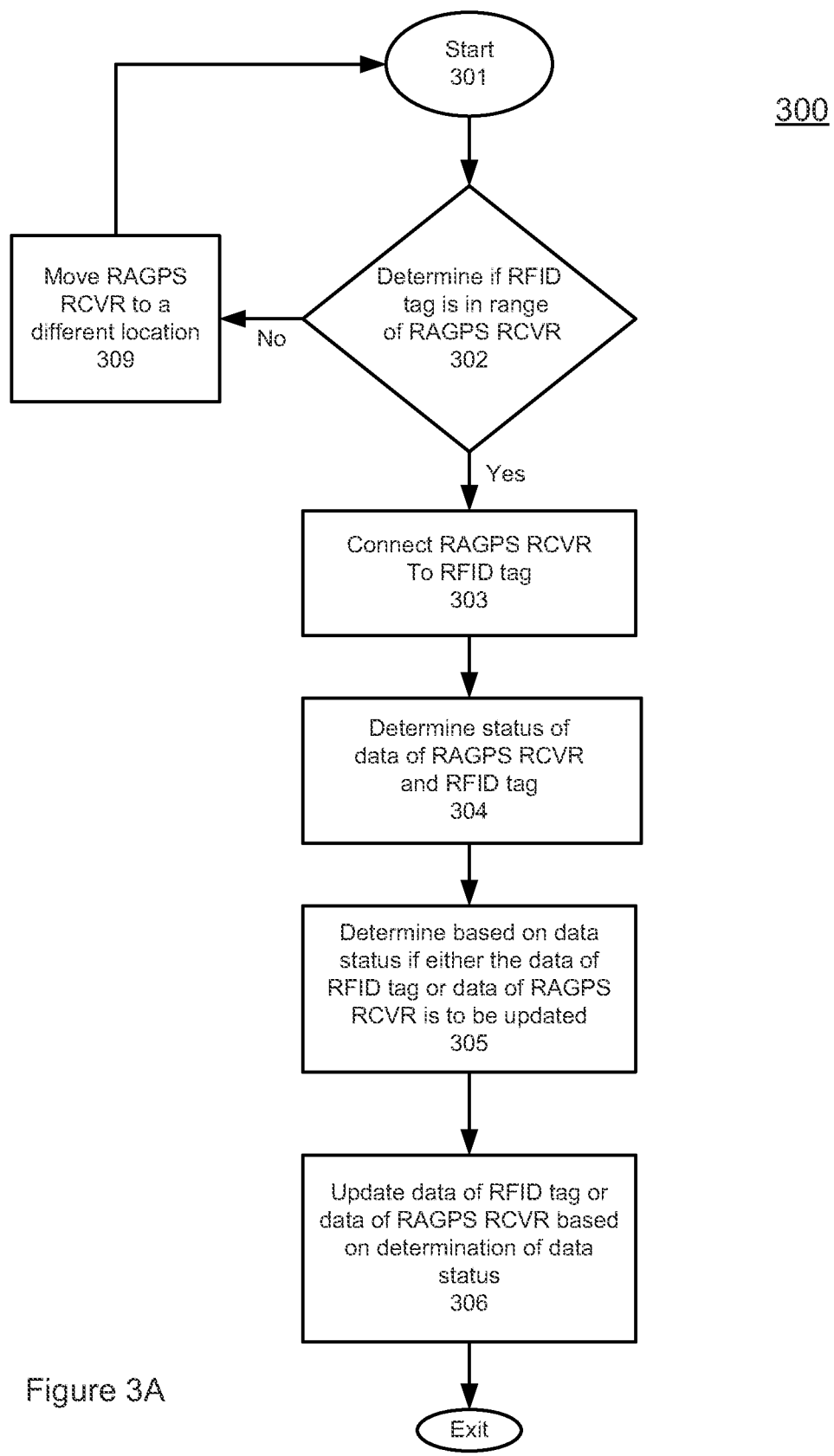
FIG. 3A is a flowchart that determines the status of the location data stored in a RFID assisted GPS (RAGPS) receiver as compared to the location data stored in a RFID assistance tag in accordance with an embodiment of the present invention.
Figure 3B:
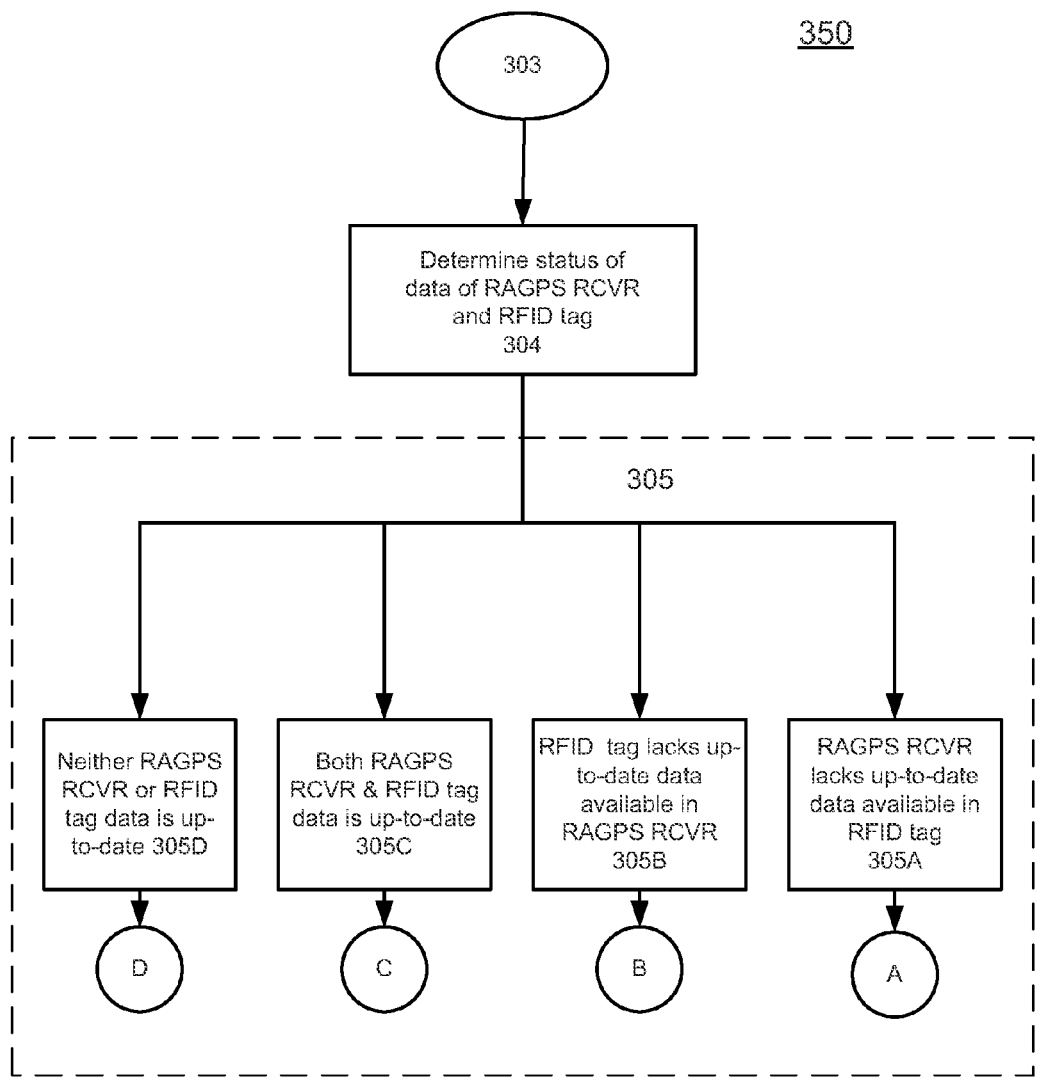
FIG. 3B is a flowchart that shows four scenarios from the determination of the location data status of FIG. 3A.
Figure 4:
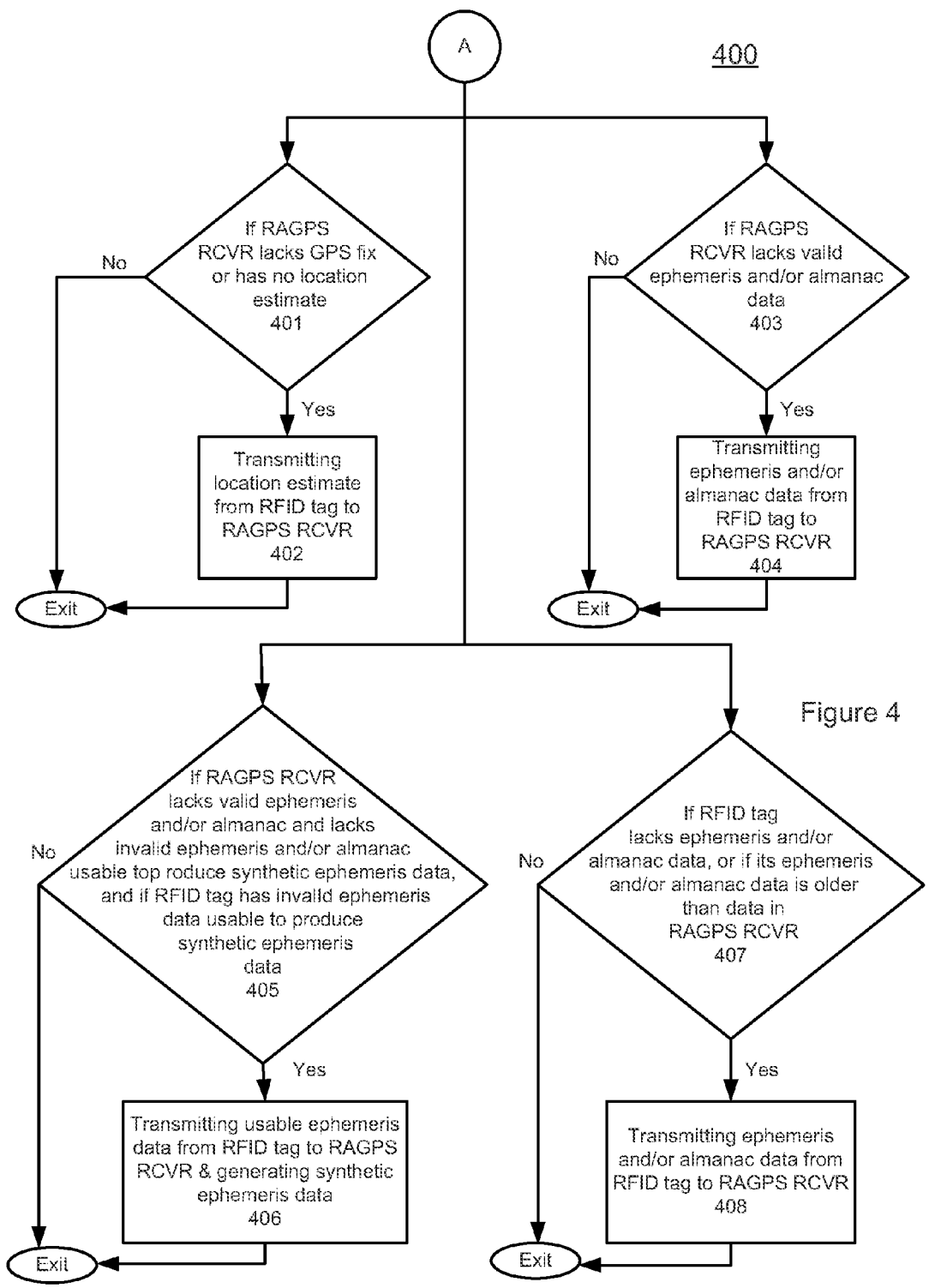
FIG. 4 is a flowchart for an updating method when the RAGPS receiver lacks up-to-date location data available in a RFID assistance tag in accordance with an embodiment of the present invention.
Figure 5:
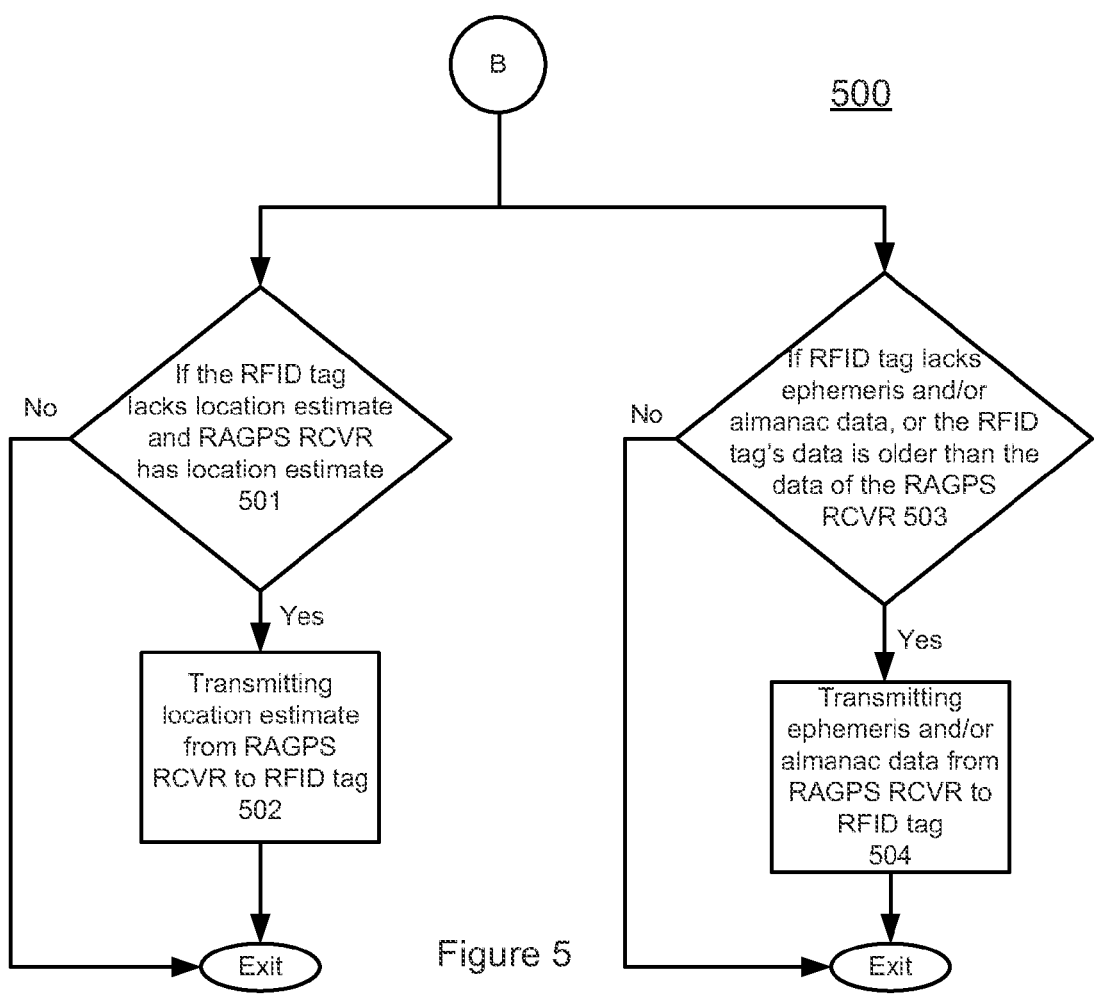
FIG. 5 is a flowchart for an updating method when the RFID assistance tag lacks up-to-date location data available in a RAGPS receiver in accordance with an embodiment of the present invention.

Per FIG. 3A and flowchart 300, the method begins with starting the process (step 301) and determining if one of the one or more RFID assistance tags is in range of the RAGPS receiver 201 (step 302). If there is no RFID assistance tag in range of the RAGPS receiver 201, the RAGPS receiver 201 may move to a different location (step 309). If one or more RFID assistance tags are in range of the RAGPS receiver 201, then the RAGPS receiver 201 connects with one of the one or more RFID assistance tags that is in range of the RAGPS receiver 201 (step 303).

Additional method steps include determining the up-to-date status of the location data of the connected RFID assistance tag 211 and the location data of the RAGPS receiver 201 (step 304), and further determining if either the location data of the connected RFID assistance tag 211, or the location data of the RAGPS receiver 201, or neither, is be updated (step 305). Finally, updating the location data of the connected RFID assistance tag 211, or the location data of the RAGPS receiver 201, or neither based on determination of the up-to-data status (step 306).

Relative to step 305, this step may include four possible scenarios. On FIG. 3B, flow chart 350 begins with step 304, that is determining the up-to-date status of the location data of the connected RFID assistance tag 211 and the location data of the RAGPS receiver 201 (step 304). Step 304 results in four possible scenarios, as previously disclosed:

Scenarios A—RAGPS Receiver 201 lacks up-to-date location data that connected RFID assistance tag 211 has (step 305A)

Scenarios B—Connected RFID assistance tag 211 lacks up-to-date location data that RAGPS receiver 201 has (step 305B)

Scenarios C—The RAGPS receiver 201 and connected RFID assistance tag 211 have up-to-date location data (step 305C)

Scenarios D—Nether connected RFID assistance tag 211 nor RAGPS receiver 201 have up-to-date location data (step 305D)

Based on the aforementioned scenarios, the updating of the location data of the connected RFID assistance tag 211 or the location data of the RAGPS receiver 201 is determined by the methods disclosed in flowcharts 400-700. For Scenario A, the outcome of step 305A is indicated by item "A". Per flowchart 400 on FIG. 4, the method is described for updating the RAGPS receiver 201. For this scenario, there are four possible alternatives.

First, if the RAGPS receiver 201 lacks a GPS location fix or has no location estimate (step 401), then the method includes transmitting location data from the connected RFID assistance tag 211 to the RAGPS receiver 201 (step 402). Second, if the RAGPS receiver 201 lacks valid ephemeris and/or almanac data step (step 403), the method includes transmitting the ephemeris and/or almanac data from the connected RFID assistance tag 211 to the RAGPS receiver 201 (step 404). Thirdly, if the RAGPS receiver 201 lacks valid ephemeris and/or almanac data, and lacks invalid ephemeris or almanac data that is usable by a self-prediction algorithm for producing synthetic ephemeris data, and if the connected RFID assistance tag 211 has invalid ephemeris data that is sufficiently up-to-date for use by self-prediction algorithms (step 405), then the method includes transmitting the sufficiently up-to-date and usable ephemeris data from the connected RFID assistance tag 211 to the RAGPS receiver 201 and generating useable synthetic ephemeris data in the RAGPS receiver 201 (step 406). Fourthly, if the connected RFID assistance tag 211 lacks ephemeris and/or almanac data, or the connected RFID assistance tag 211 has ephemeris and/or almanac data that is older than the ephemeris or almanac data in the RAGPS receiver 201 (step 407), the method includes transmitting the ephemeris and/or almanac data from the RAGPS receiver 201 to the connected RFID assistance tag 211 (step 408).

For Scenario B, if the connected RFID assistance tag 211 lacks up-to-date location data available in the RAGPS receiver 201, the outcome of step 305B is indicated by item "B". Per flowchart 500 on FIG. 5, the method is described for updating the connected RFID assistance tag 211. For this scenario, there are two possible alternatives.

First, if the RFID assistance 211 lacks current location estimate and the RAGPS receiver has a current location estimate (step 501). Then the method includes transmitting current location estimate from the RAGPS receiver 201 to the connected RFID assistance tag 211 (step 502). Second, if the connected RFID assistance tag 211 lacks ephemeris data and/or almanac data, or the connected RFID assistance tag 211's data is older than the data of the RAGPS receiver 201 (step 503), then the method includes transmitting ephemeris data and/or almanac data from the RAGPS receiver to the RFID assistance tag (step 504).

For Scenario C, wherein the RAGPS receiver 201 and the connected RFID assistance tag 211 have up-to-date location data, the method further includes the steps of updating the connected RFID assistance tag 211. The outcome of step 305C is indicated by item "C". Per flowchart 600 on FIG. 6, the method includes steps updating the latitude and longitude in the connected RFID assistance tag 211.

Figure 6:
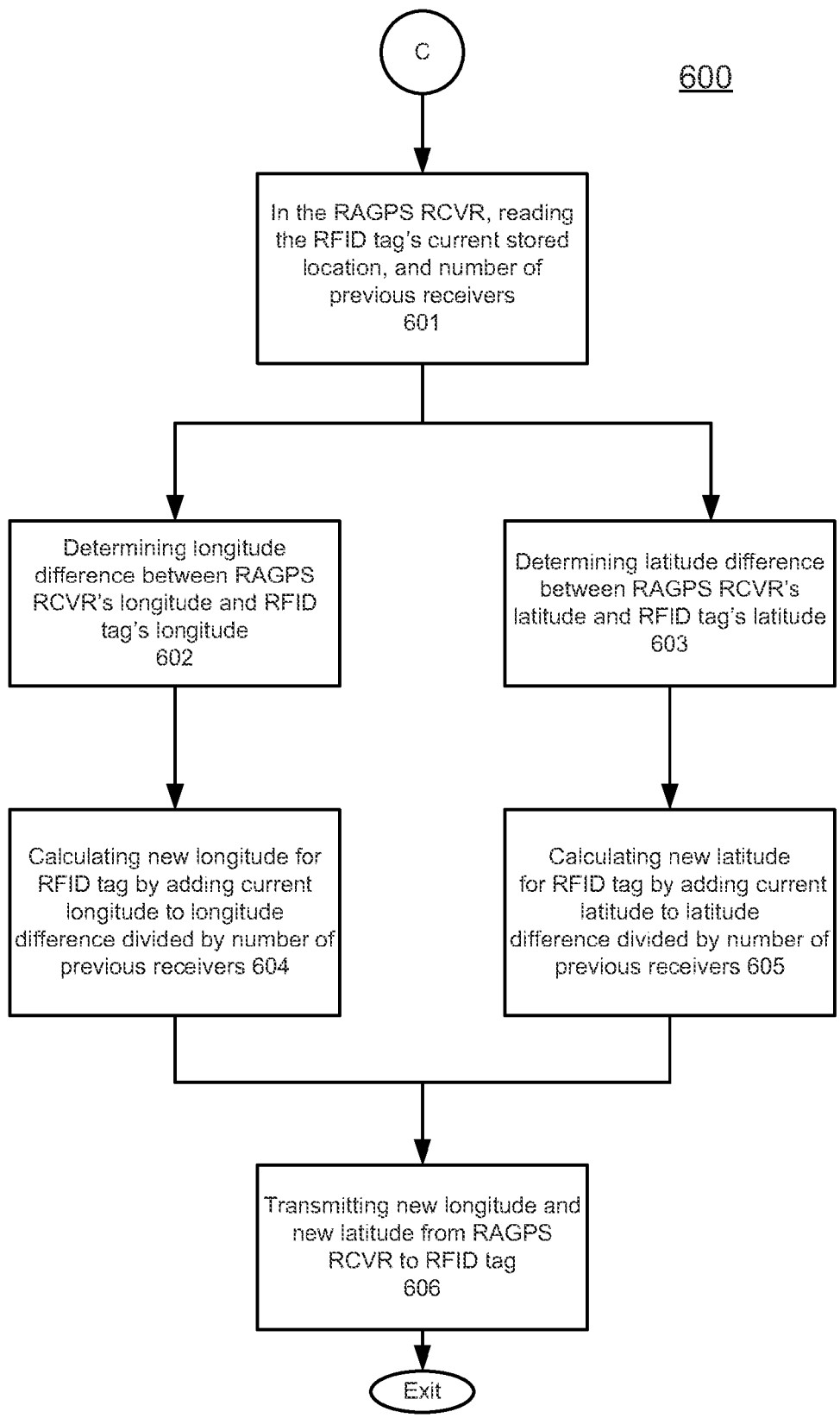
FIG. 6 is a flowchart for an updating method when the RAGPS receiver and the RFID assistance tag have up-to-date location data in accordance with an embodiment of the present invention.
Figure 7:
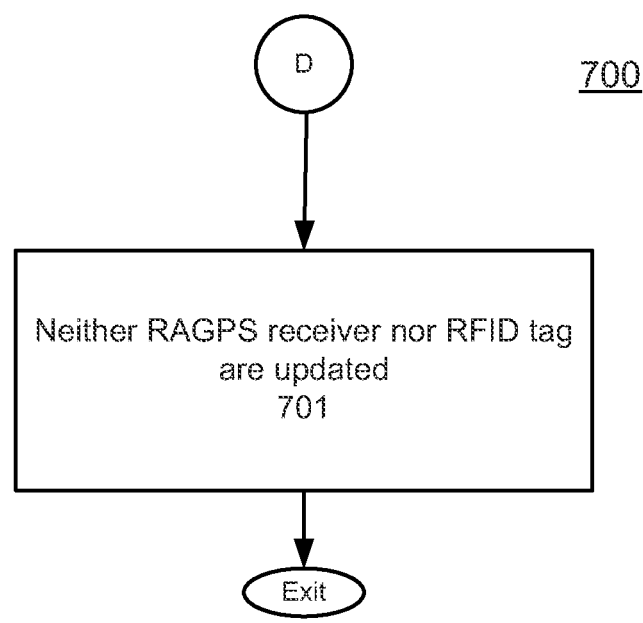
FIG. 7 is a flowchart for the status when neither the RFID assistance tag nor the RAGPS receiver has up-to-date location data in accordance with an embodiment of the present invention.

Per flowchart 600 on FIG. 6, the method is described for updating the connected RFID assistance tag 211. The first step includes, in the RAGPS receiver 201, reading the connected RFID assistance tag's 211 current location estimate, and number of previous receivers that have contributed to this location (step 601). The next step includes determining longitude difference between the RAGPS receiver's 201 longitude and the connected RFID assistance tag's 211 longitude (step 602), then calculating a new longitude for the connected RFID assistance tag 211 by adding the current longitude to the longitude difference divided by the number of previous receivers (step 604). In parallel, the latitude is calculated by determining the latitude difference between the RAGPS receiver's 201 latitude and the connected RFID assistance tag's 211 latitude (step 603), then calculating a new latitude for the connected RFID assistance tag 211 by adding the current latitude to the latitude difference divided the number of previous receivers (step 605). Finally, the method includes transmitting the new longitude and new latitude from the RAGPS receiver 201 to the connected RFID assistance tag 211 (step 606).

For Scenario D, wherein if neither the RAGPS receiver nor the RFID assistance tag have location data that is up-to-date, no updating action is taken (step 701). The reference flowchart is 700 on FIG. 7.

While various embodiments of the invention have been described, it will be apparent to those of ordinary skill in the art that many more embodiments and implementations are possible that are within the scope of this invention. For example, any combination of any of the systems or methods described in this disclosure is possible.

What is claimed is:

1. A radio frequency identification assisted global positioning system (RAGPS) receiver comprising:
   a global positioning system (GPS) receiver to receive up-to-date location data;
   a radio frequency identification (RFID) subsystem including an RFID tag reader and a RFID transmitter, the RFID tag reader to read location data stored in a RFID assistance tag in communication with the RAGPS receiver, the RFID transmitter to transmit up-to-date location data to the RFID assistance tag, wherein the RFID assistance tag is positioned in a location in which GPS signals are blocked; and
   a controller in communication with the GPS receiver and the RFID subsystem, the controller to determine whether the RFID assistance tag stores location data that is more up-to-date than location data stored in the RAGPS receiver, the location data stored in the RFID assistance tag including a timestamp having both an update time and an expiration time;
   wherein the controller is further configured to (i) cause the RFID transmitter to transmit location data to the RFID assistance tag if the location data stored in the RAGPS receiver is more up-to-date than the location data stored in the RFID assistance tag, and (ii) transfer the location data stored in the RFID assistance tag to the GPS receiver if the location data stored in the RFID assistance tag is more up-to-date than the location data stored in the RAGPS receiver.

2. The RAGPS receiver of claim 1, wherein the location data stored in the RFID assistance tag further includes a current location estimate designating an estimated longitude and latitude of the RFID assistance tag, and ephemeris data and almanac data related to previous locations of orbiting GPS satellites associated with the current location estimate.

3. The RAGPS receiver of claim 2, wherein in response to the timestamp indicating that the location data stored in the RFID tag is expired, the controller determines whether the ephemeris data is usable to estimate updated ephemeris data for the orbiting GPS satellites associated with the current location estimate.

4. The RAGPS receiver of claim 3, wherein in response to determining that the ephemeris data is usable, estimating updated ephemeris data for the orbiting GPS satellites.

5. The RAGPS receiver of claim 1, wherein the controller is further configured to cause the RFID transmitter to overwrite expired location data stored in the RFID assistance tag.

6. The RAGPS receiver of claim 1, wherein the location data stored in the RAGPS receiver is updated by a network connection.

7. The RAGPS receiver of claim 1, wherein the location data stored in the RAGPS receiver is updated by GPS satellites.

8. The RAGPS receiver of claim 1, wherein the RAGPS receiver comprises one or more integrated circuits.

9. The RAGPS receiver of claim 1, wherein the RFID assistance tag comprises one or more integrated circuits.

10. A method for updating location data, the method being performed by a radio frequency identification assisted global positioning system (RAGPS) receiver that includes a global positioning system (GPS) receiver, the method comprising:
    determining whether a radio frequency identification (RFID) assistance tag is in range of the RAGPS receiver, the RFID assistance tag being positioned in a location in which GPS signals are blocked, the RFID assistance tag storing location data including a timestamp having both an update time and an expiration time;
    connecting to the RFID assistance tag if the RFID assistance tag is in range;
    determining an up-to-date status of the location data stored in the RFID assistance tag by comparing location data stored in the RAGPS receiver to the location data stored in the RFID assistance tag;

transmitting location data to the RFID assistance tag if the location data stored in the RAGPS receiver is more up-to-date than the location data stored in the RFID assistance tag; and transferring the location data stored in the RFID assistance tag to the GPS receiver if the location data stored in the RFID assistance tag is more up-to-date than the location data stored in the RAGPS receiver.

11. The method of claim 10 wherein the location data stored in the RFID assistance tag further includes a current location estimate designating an estimated longitude and latitude for the RFID assistance tag, and ephemeris and almanac data related to previous locations of orbiting GPS satellites associated with the current location estimate.

12. The method of claim 11, further comprising:

in response to determining that the location data stored in the RFID assistance tag is up-to-date:
  reading the current location estimate of the RFID assistance tag and a number of previous RAGPS receivers that have contributed to the current location estimate of the RFID assistance tag;
  determining a longitude difference between a longitude stored in the RAGPS receiver and the estimated longitude of the RFID assistance tag;
  calculating a new longitude for the RFID assistance tag by adding the estimated longitude of the RFID assistance tag to the longitude difference divided by the number of previous RAGPS receivers;
  determining a latitude difference between a latitude stored in the RAGPS receiver and the estimated latitude of the RFID assistance tag;
  calculating a new latitude for the RFID assistance tag by adding the estimated latitude of the RFID assistance tag to the latitude difference divided by the number of previous RAGPS receivers; and
  transmitting the new longitude and new latitude to the RFID assistance tag as a part of an updated current location estimate.

13. The method of claim 11, wherein in response to determining that neither the RAGPS receiver nor the RFID assistance tag store up-to-date location data, disconnecting with the RFID assistance tag.

14. The method of claim 11, wherein determining the up-to-date status of the location data stored in the RFID assistance tag includes individually comparing the current location estimate, the ephemeris data, and the almanac data stored in the RFID assistance tag to the location data stored in the RAGPS receiver, and individually determining an up-to-date status for each of the current location estimate, the ephemeris data, and the almanac data from the individual comparisons.

15. The method of claim 14, further comprising:

in response to individually determining the up-to date status for each of the current location estimate, the ephemeris data, and the almanac data, individually updating at least one of the RFID assistance tag or the RAGPS receiver with a respective up-to-date current location estimate, respective up-to-date ephemeris data, and respective up-to-date almanac data.

16. The method of claim 11, wherein in response to the timestamp indicating that the location data stored in the RFID tag is expired, determining whether the expired ephemeris data is usable to estimate updated ephemeris data for the orbiting GPS satellites.

17. The method of claim 16, wherein in response to determining that the ephemeris data is usable, estimating updated ephemeris data for the orbiting GPS satellites.

18. The method of claim 10, further comprising:

overwriting the location data stored in the RFID assistance tag if the up-to-date status indicates that the location data stored in the RFID assistance tag is expired.

* * * * *